US 12,506,168 B2

(12) United States Patent
Ahn et al.

(10) Patent No.: US 12,506,168 B2
(45) Date of Patent: Dec. 23, 2025

(54) FUEL CELL

(71) Applicants: Hyundai Motor Company, Seoul (KR); Kia Corporation, Seoul (KR); DYP CO., LTD., Ansan-si (KR)

(72) Inventors: Jae Min Ahn, Daejeon (KR); Yong Suk Heo, Seoul (KR); Tae Geun Kim, Hwaseong-si (KR); Min Woo Lee, Hwaseong-si (KR)

(73) Assignees: Hyundai Motor Company, Seoul (KR); Kia Corporation, Seoul (KR); DYP CO., LTD., Ansan-si (KR)

( * ) Notice: Subject to any disclaimer, the term of this patent is extended or adjusted under 35 U.S.C. 154(b) by 715 days.

(21) Appl. No.: 17/937,162

(22) Filed: Sep. 30, 2022

(65) Prior Publication Data
US 2023/0163339 A1    May 25, 2023

(30) Foreign Application Priority Data

Nov. 24, 2021  (KR) .......................... 10-2021-0163320

(51) Int. Cl.
*H01M 8/2475*  (2016.01)
*H01M 8/0273*  (2016.01)
*H01M 8/0276*  (2016.01)
*H01M 8/1004*  (2016.01)

(52) U.S. Cl.
CPC ....... *H01M 8/2475* (2013.01); *H01M 8/0273* (2013.01); *H01M 8/0276* (2013.01); *H01M 8/1004* (2013.01)

(58) Field of Classification Search
None
See application file for complete search history.

(56) References Cited

U.S. PATENT DOCUMENTS

| | | | |
|---|---|---|---|
| 9,960,407 B2 | 5/2018 | Nakayama et al. | |
| 10,014,549 B2 | 7/2018 | Nishiumi et al. | |
| 10,461,354 B2 | 10/2019 | Naito | |
| 10,468,705 B2 | 11/2019 | Nishiumi | |
| 10,468,708 B2 | 11/2019 | Yamaura | |
| 2008/0102343 A1* | 5/2008 | Cho ...................... | H01M 8/248 |
| | | | 429/514 |
| 2011/0293981 A1 | 12/2011 | Fang et al. | |
| 2015/0194696 A1* | 7/2015 | Kim ..................... | H01M 8/2475 |
| | | | 429/469 |

FOREIGN PATENT DOCUMENTS

| | | |
|---|---|---|
| CN | 209133547 U | 7/2019 |
| JP | 2017107749 A | 6/2017 |
| KR | 101586597 B1 | 1/2016 |
| KR | 20160057991 A | 5/2016 |
| KR | 101850190 B1 | 4/2018 |

* cited by examiner

*Primary Examiner* — Alix E Eggerding
(74) *Attorney, Agent, or Firm* — Slater Matsil, LLP

(57) ABSTRACT

In an embodiment a fuel cell includes a cell stack having a plurality of unit cells stacked in a first direction, an end plate disposed on at least one of both side ends of the cell stack, an enclosure coupled to the end plate to surround a side portion of the cell stack, the enclosure being divided into a plurality of segments, a plate gasket disposed on the end plate and an enclosure gasket disposed between the plurality of segments, wherein one of the plate gasket and the enclosure gasket comprises a protruding portion protruding in the first direction, and a remaining one of the plate gasket and the enclosure gasket comprises a depressed portion depressed in the first direction to receive the protruding portion fitted thereinto.

19 Claims, 17 Drawing Sheets

FUEL CELL

CROSS-REFERENCE TO RELATED APPLICATIONS

This application claims the benefit of Korean Patent Application No. 10-2021-0163320, filed on Nov. 24, 2021, which is hereby incorporated by reference as if fully set forth herein.

TECHNICAL FIELD

The present application relates to a fuel cell.

BACKGROUND

In general, a fuel cell includes a polymer electrolyte membrane, and generates electrical energy using air supplied to one surface of the polymer electrolyte membrane and hydrogen supplied to the opposite surface of the polymer electrolyte membrane. A fuel cell may be used to supply electrical energy to a vehicle. Such a fuel cell requires reliable airtightness and watertightness.

SUMMARY

Accordingly, embodiments are directed to a fuel cell that substantially obviates one or more problems due to limitations and disadvantages of the related art.

Embodiments provide a fuel cell having improved performance with regard to airtightness and watertightness.

A fuel cell according to an embodiment may include a cell stack including a plurality of unit cells stacked in a first direction, an end plate disposed on at least one of both side ends of the cell stack, an enclosure coupled to the end plate to surround a side portion of the cell stack and divided into a plurality of segments, a plate gasket disposed on the end plate, and an enclosure gasket disposed between the plurality of segments. One of the plate gasket and the enclosure gasket may include a protruding portion protruding in the first direction, and the remaining one of the plate gasket and the enclosure gasket may include a depressed portion depressed in the first direction to receive the protruding portion fitted thereinto.

For example, the plurality of segments may include a first segment, which includes a first coupling portion and a second coupling portion, and a second segment, which is coupled to the first segment and includes a third coupling portion and a fourth coupling portion, which respectively face the first coupling portion and the second coupling portion. The enclosure gasket may include a first enclosure gasket, disposed on the first coupling portion or the third coupling portion, and a second enclosure gasket, disposed on the second coupling portion or the fourth coupling portion.

For example, the first segment may have an "L"-shaped external appearance, and the second segment may have a "¬"-shaped external appearance.

For example, the plurality of segments may include a first segment, which includes a first coupling portion and a second coupling portion, a second segment, which is coupled to the first segment and includes a third coupling portion facing the second coupling portion and a fourth coupling portion formed opposite the third coupling portion, a third segment, which is coupled to the second segment and includes a fifth coupling portion facing the fourth coupling portion and a sixth coupling portion formed opposite the fifth coupling portion, and a fourth segment, which is coupled to the first segment and the third segment and includes a seventh coupling portion facing the sixth coupling portion and an eighth coupling portion facing the first coupling portion. The enclosure gasket may include a first enclosure gasket disposed on the first coupling portion or the eighth coupling portion, a second enclosure gasket disposed on the second coupling portion or the third coupling portion, a third enclosure gasket disposed on the fourth coupling portion or the fifth coupling portion, and a fourth enclosure gasket disposed on the sixth coupling portion or the seventh coupling portion.

For example, at least one of the first to fourth enclosure gaskets may include a body embodied in a coupling portion of a corresponding segment, among the first to fourth segments, and a coupling protrusion protruding from the body toward a coupling portion facing the coupling portion of the corresponding segment.

For example, the enclosure gasket may be disposed so as to extend in the first direction, and may have a length longer than the length of the enclosure in the first direction.

For example, the protruding portion may be disposed on the enclosure gasket, and the depressed portion may be disposed in the plate gasket.

For example, the protruding portion may be disposed on the plate gasket, and the depressed portion may be disposed in the enclosure gasket.

For example, the length that the protruding portion protrudes in the first direction may be less than the depth to which the depressed portion is depressed in the first direction.

For example, when the protruding portion is inserted into the depressed portion, the protruding portion and the depressed portion may be elastically coupled to each other such that the protruding portion expands in a second direction, which intersects the first direction, and contracts in the first direction and such that the depressed portion expands in the second direction to the same extent as the protruding portion.

For example, the enclosure gasket may include a fixing protrusion protruding in a second direction, which intersects the first direction.

For example, the distance that the fixing protrusion is spaced apart from the rear end of the protruding portion in the first direction may be 0 or more.

For example, the height that the fixing protrusion protrudes in the second direction may be proportional to the thickness of the enclosure gasket in the second direction.

For example, each of the protruding portion and the depressed portion may have an inclined cross-sectional shape.

For example, the width of the front end of the protruding portion in a second direction, which intersects the first direction, may be smaller than the width of an opening of the depressed portion in the second direction.

For example, the plate gasket and the enclosure gasket may have the same elasticity.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF ILLUSTRATIVE EMBODIMENTS

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above", and "under/lower part/below", are used only to distinguish between one subject or element and another subject or element, without necessarily requiring or involving any physical or logical relationship or sequence between the subjects or elements.

Hereinafter, a fuel cell 100 according to an embodiment will be described with reference to the accompanying drawings. The fuel cell 100 will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, the x-axis, the y-axis, and the z-axis may intersect each other obliquely.

Hereinafter, the +x-axis direction and the −x-axis direction will be referred to as a "first direction", the +y-axis direction and the −y-axis direction will be referred to as a "second direction", and the +z-axis direction and the −z-axis direction will be referred to as a "third direction".

Figure 1:
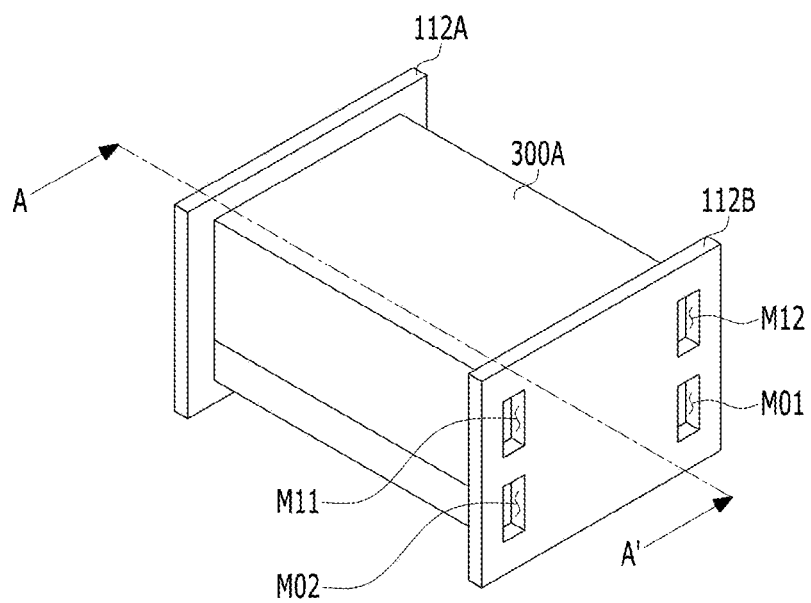
FIG. 1 is a coupled perspective view of a fuel cell according to an embodiment.
Figure 2:
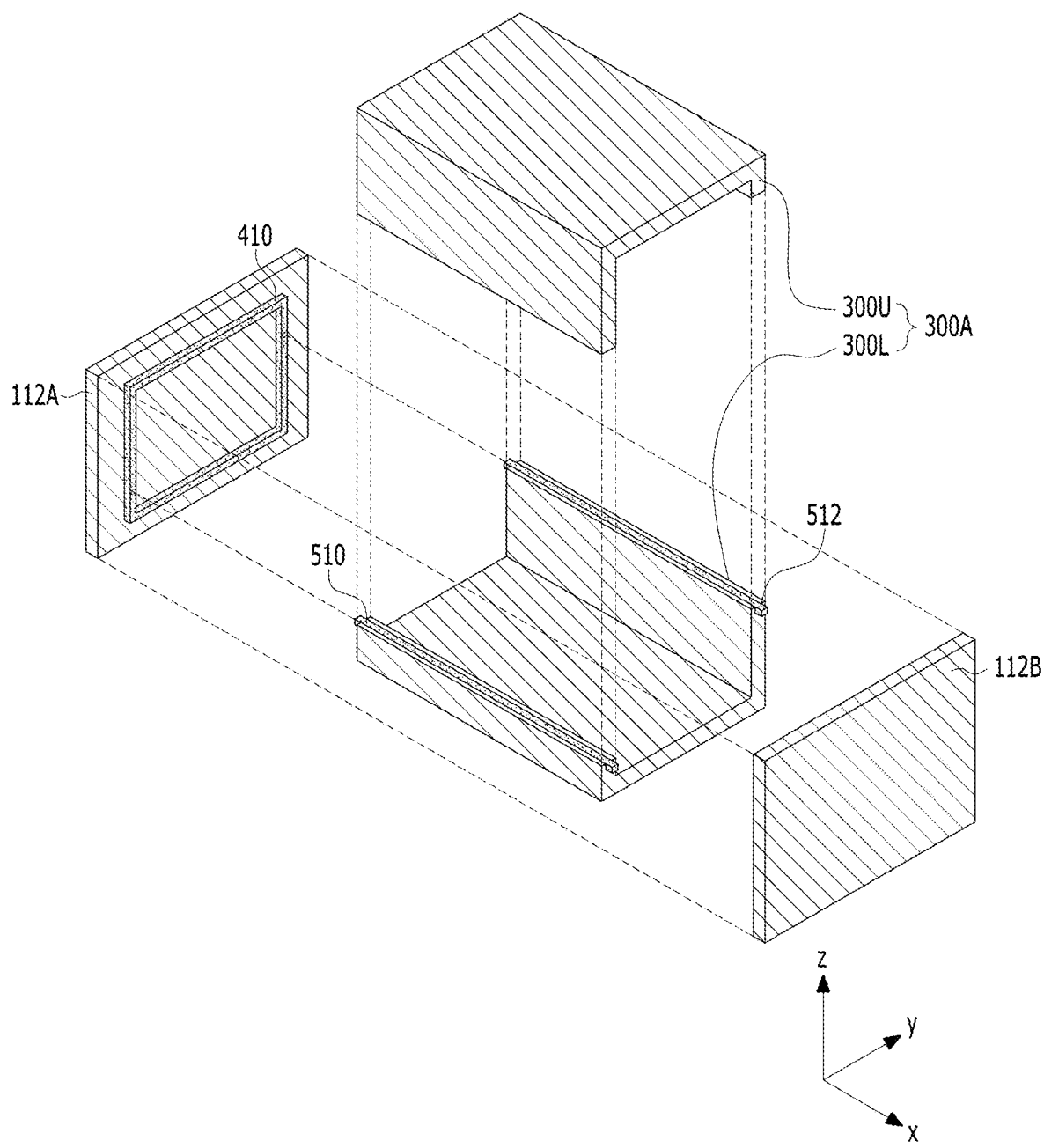
FIG. 2 is an exploded perspective view of the fuel cell shown in FIG. 1.
Figure 3:
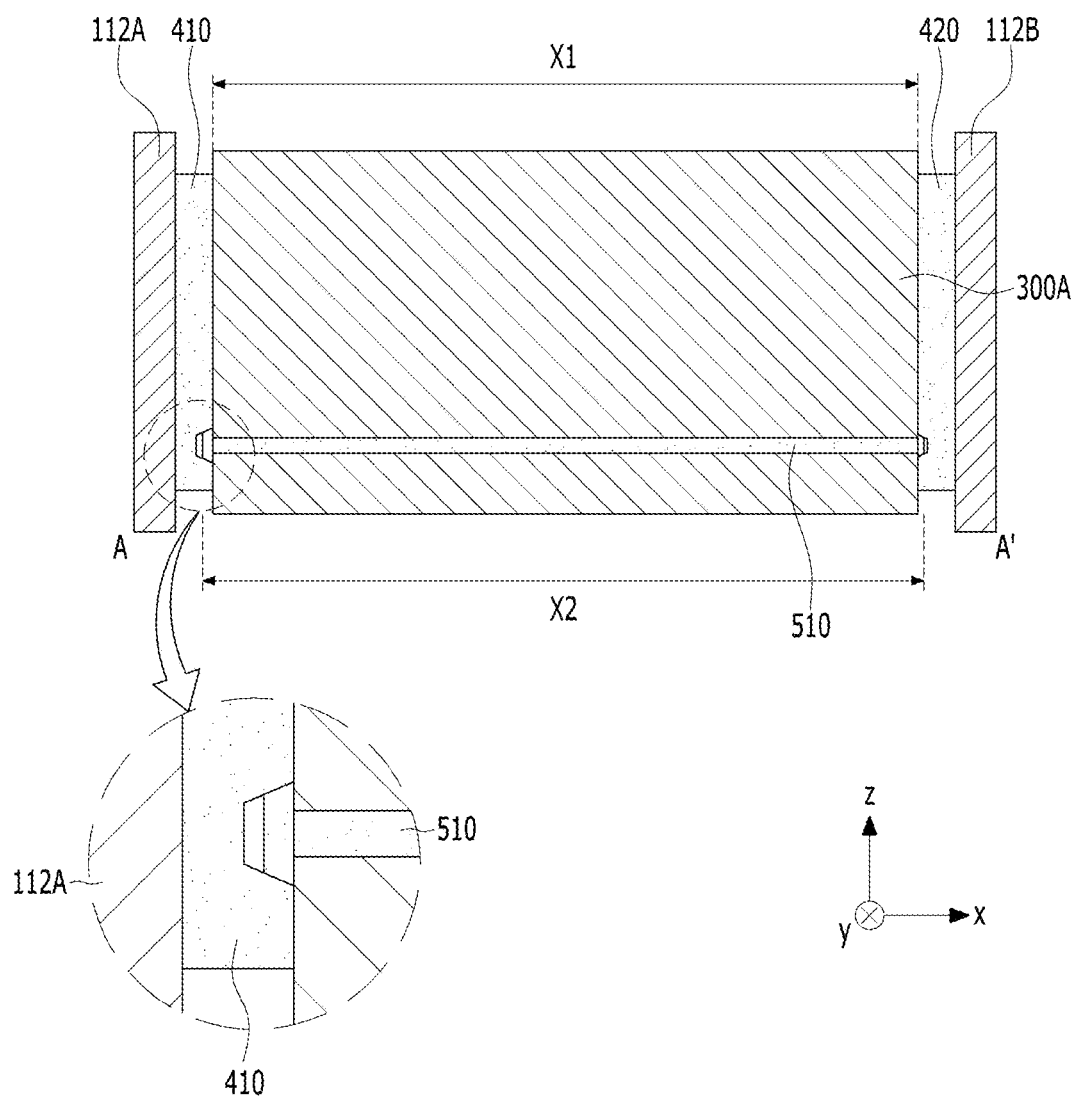
FIG. 3 is a cross-sectional view taken along line A-A' in the fuel cell shown in FIG. 1.
Figure 4:
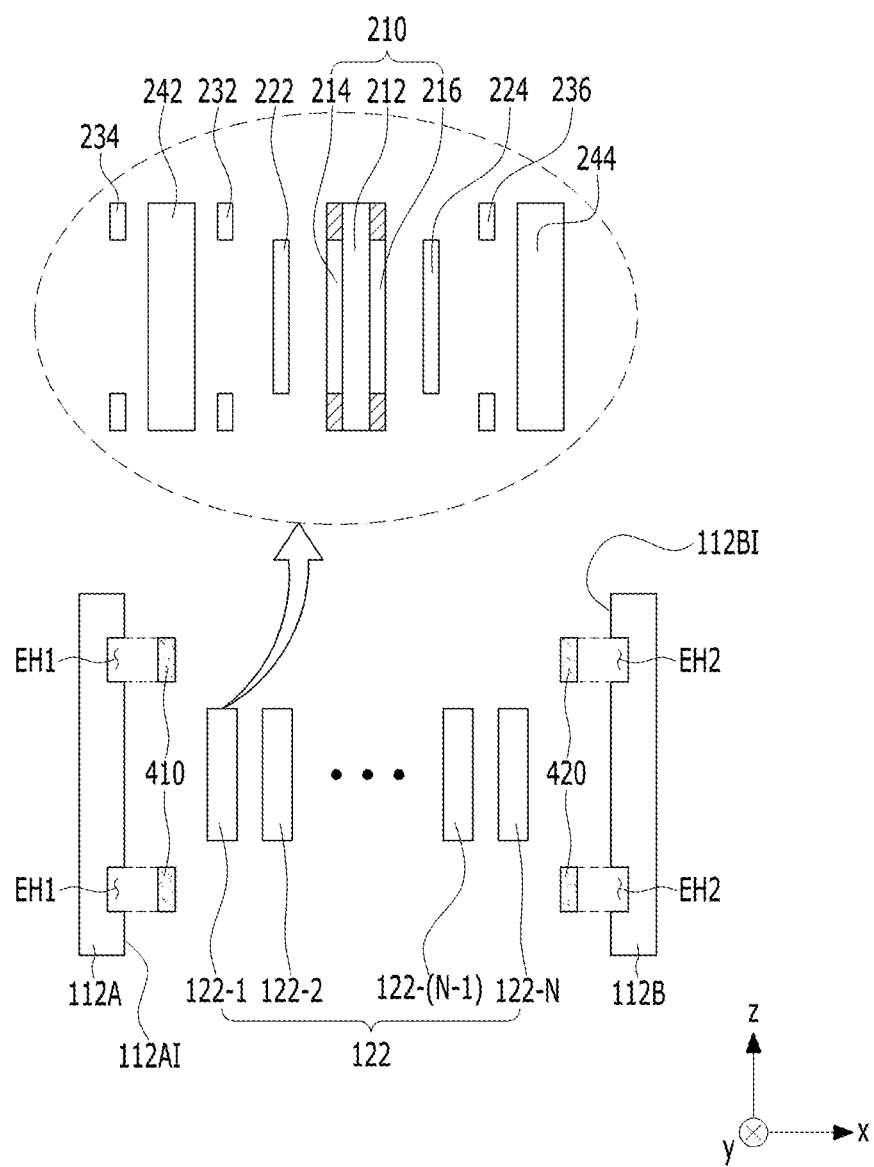
FIG. 4 is a cross-sectional view of the fuel cell shown in FIG. 1.

FIG. 1 is a coupled perspective view of a fuel cell 100 according to an embodiment, FIG. 2 is an exploded perspective view of the fuel cell 100 shown in FIG. 1, FIG. 3 is a cross-sectional view taken along line A-A' in the fuel cell 100 shown in FIG. 1, and FIG. 4 is a cross-sectional view of the fuel cell 100 shown in FIG. 1.

For convenience of description, illustration of the cell stack 122 shown in FIG. 4 is omitted from FIG. 2, and illustration of the plurality of manifolds (or communication portions) M shown in FIG. 1 is omitted from FIGS. 2 and 3. Also, illustration of an enclosure 300A is omitted from FIG. 4.

A fuel cell 100 may be, for example, a polymer electrolyte membrane fuel cell (or a proton exchange membrane fuel cell) (PEMFC), which has been studied most extensively as a power source for driving vehicles. However, the embodiments are not limited to any specific type of fuel cell.

The fuel cell 100 may include first and second end plates (pressing plates or compression plates) 112A and 112B, outer gaskets (hereinafter referred to as "plate gaskets") 410 and 412, a cell stack 122, and an enclosure 300A. Although not shown, the fuel cell 100 may further include first and second end cell heaters and current collectors.

Referring to FIG. 4, the cell stack 122 may include a plurality of unit cells 122-1 to 122-N, which are stacked in the first direction. Here, "N" is a positive integer of 1 or greater, and may range from several tens to several hundreds. However, the embodiments are not limited to any specific value of "N". Each unit cell 122-$n$ may generate, for example, a predetermined magnitude of electrical energy. Here, $1 \leq n \leq N$. "N" may be determined depending on the intensity of the power to be supplied from the fuel cell 100 to a load. Here, the term "load" refers to a part of a vehicle that requires power when the fuel cell 100 is used in a vehicle.

Each unit cell 122-$n$ may include a membrane electrode assembly (MEA) 210, gas diffusion layers (GDLs) 222 and 224, first to third inner gaskets 232, 234, and 236, and first and second separators (or bipolar plates) 242 and 244.

The membrane electrode assembly 210 has a structure in which catalyst electrode layers, in which electrochemical reaction occurs, are attached to both sides of an electrolyte membrane through which hydrogen ions move. Specifically, the membrane electrode assembly 210 may include a polymer electrolyte membrane (or a proton exchange membrane) 212, a fuel electrode (a hydrogen electrode or an anode) 214, and an air electrode (an oxygen electrode or a cathode) 216.

The polymer electrolyte membrane 212 is disposed between the fuel electrode 214 and the air electrode 216.

Hydrogen, which is the fuel in the fuel cell 100, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. Only the hydrogen ions may be selectively transferred to the air electrode 216 through the polymer electrolyte membrane 212, and at the same time, the electrons may be transferred to the air electrode 216 through the first and second separators 242 and 244, which are conductors. In order to realize the above operation, a catalyst layer may be applied to each of the fuel electrode 214 and the air electrode 216. The movement of the electrons described above causes the electrons to flow through an external wire, thus generating current. That is, the fuel cell 100 may generate power due to the electrochemical reaction between hydrogen, which is fuel, and oxygen contained in the air.

In the air electrode 216, the hydrogen ions supplied through the polymer electrolyte membrane 212 and the electrons transferred through the first and second separators 242 and 244 meet oxygen in the air supplied to the air electrode 216, thus causing a reaction that generates water ("condensate water" or "product water").

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode.

The gas diffusion layers 222 and 224 serve to uniformly distribute hydrogen and oxygen, which are reaction gases, and to transfer the generated electrical energy. To this end, the gas diffusion layers 222 and 224 may be disposed on respective sides of the membrane electrode assembly 210. That is, the first gas diffusion layer 222 may be disposed on the left side of the fuel electrode 214, and the second gas diffusion layer 224 may be disposed on the right side of the air electrode 216.

The first gas diffusion layer 222 may serve to diffuse and uniformly distribute hydrogen supplied as a reactant gas through the first separator 242, and may be electrically conductive. The second gas diffusion layer 224 may serve to diffuse and uniformly distribute air supplied as a reactant gas through the second separator 244, and may be electrically conductive.

The first, second, and third inner gaskets 232, 234, and 236 may serve to maintain airtightness and clamping pressure of the cell stack at an appropriate level with respect to the reactant gases and the coolant, to disperse the stress when the first and second separators 242 and 244 are stacked, and to independently seal the flow paths. As such, since airtightness and watertightness are maintained by the first, second, and third inner gaskets 232, 234, and 236, the flatness of the surfaces that are adjacent to the cell stack 122, which generates power, may be secured, and thus surface pressure may be distributed uniformly over the reaction surface of the cell stack 122.

The first and second separators 242 and 244 may serve to move the reactant gases and the cooling medium and to separate each of the unit cells from the other unit cells. In addition, the first and second separators 242 and 244 may serve to structurally support the membrane electrode assembly 210 and the gas diffusion layers 222 and 224 and to collect the generated current and transfer the collected current to the current collectors.

The first and second separators 242 and 244 may be respectively disposed outside the first and second gas diffusion layers 222 and 224. That is, the first separator 242 may be disposed on the left side of the first gas diffusion layer 222, and the second separator 244 may be disposed on the right side of the second gas diffusion layer 224.

The first separator 242 serves to supply hydrogen as a reactant gas to the fuel electrode 214 through the first gas diffusion layer 222. The second separator 244 serves to supply air as a reactant gas to the air electrode 216 through the second gas diffusion layer 224. In addition, each of the first and second separators 242 and 244 may form a channel through which a cooling medium (e.g. coolant) flows. Further, the separators 242 and 244 may be formed of a graphite-based material, a composite graphite-based material, or a metal-based material. However, the embodiments are not limited to any specific material of the separators 242 and 244.

The first and second end plates 112A and 112B shown in FIGS. 1 to 4 may be disposed at respective ends of the cell stack 122, and may support and fix the cell stack 122 in which the multiple unit cells are stacked. That is, the first end plate 112A may be disposed at one end of the cell stack 122, and the second end plate 110B may be disposed at the opposite end of the cell stack 122.

Further, each of the first and second end plates 112A and 112B may be formed by combining multiple plates.

Further, at least one of the first end plate 112A or the second end plate 112B may include a plurality of manifolds M. Further, each of the first and second separators 242 and 244 may include manifolds that are formed in the same shape at the same positions as the manifolds M formed in at least one of the first end plate 112A or the second end plate 112B. The manifolds M may include inlet manifolds MI1, MI2, and MI3 and outlet manifolds MO1, MO2, and MO3. Hydrogen and oxygen, which are reactant gases necessary in the membrane electrode assembly 210, may be introduced into the cell stack 122 from outside through the inlet manifolds MI1 and MI2. Gas or liquid, in which the reactant gases humidified and supplied to the cell and the condensate water generated in the cell are combined, may be discharged to the outside of the fuel cell 100 through the outlet manifolds MO1 and MO2. The cooling medium may flow from the outside into the cell stack 122 through the inlet manifold MI3, and may flow to the outside through the outlet manifold MO3. As described above, the manifolds M (MI1 to MI3 and MO1 to MO3) allow the fluid to flow into and out of the membrane electrode assembly 210.

For example, as shown in FIG. 1, some (e.g. MI1, MI2, MO1, and MO2) of the manifolds M (MI1 to MI3 and MO1 to MO3) may be formed in the second end plate 112B (or the first end plate 112A), and the remaining ones MI3 and MO3 of the manifolds M (MI1 to MI3 and MO1 to MO3) may be formed in the first end plate 112A (or the second end plate 112B). Alternatively, unlike what is illustrated in FIG. 1, the manifolds M (MI1 to MI3 and MO1 to MO3) may be formed in the first end plate 112A or the second end plate 112B.

The enclosure 300A may be coupled to at least one of the first end plate 112A or the second end plate 112B to surround the side portion of the cell stack 122.

As shown in FIGS. 1 to 3, the enclosure 300A may be disposed between the first end plate 112A and the second end plate 112B, and may be coupled to the first end plate 112A and the second end plate 112B to surround the side portion of the cell stack 122, which is disposed between the first end plate 112A and the second end plate 112B.

Alternatively, unlike what is illustrated in FIGS. 1 to 3, the enclosure 300A may be coupled to the second end plate 112B, rather than being coupled to the first end plate 112A, so as to surround the side portion of the cell stack 122, or may be coupled to the first end plate 112A, rather than being coupled to the second end plate 112B, so as to surround the side portion of the cell stack 122.

The enclosure 300A may be coupled to at least one of the first end plate 112A or the second end plate 112B, and may thus serve as a clamping member for clamping the plurality of unit cells in the first direction. For example, the clamping pressure of the cell stack 122 may be maintained by the first and second end plates 112A and 112B, which have rigid body structures, and the enclosure 300A.

The following description may also apply to the case in which only one of the first and second end plates 112A and 112B is coupled to the enclosure 300A and the other one thereof is surrounded by the enclosure 300A.

Figure 5:
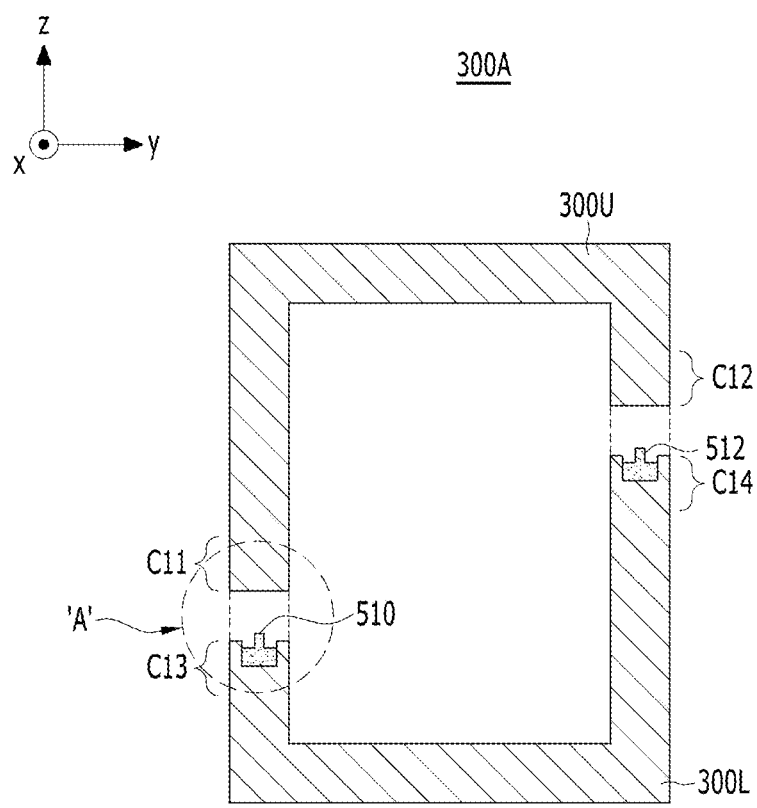
FIG. 5 shows the cross-sectional shape of an embodiment of an enclosure included in the fuel cell.
Figure 6:
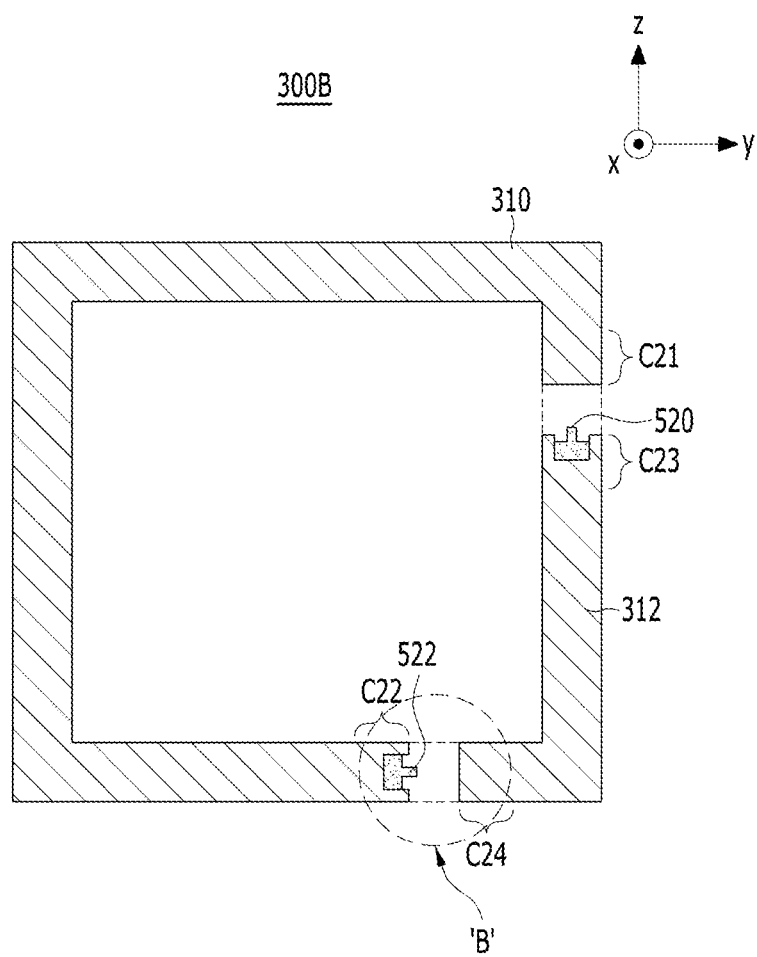
FIG. 6 shows the cross-sectional shape of another embodiment of an enclosure included in the fuel cell.
Figure 7:
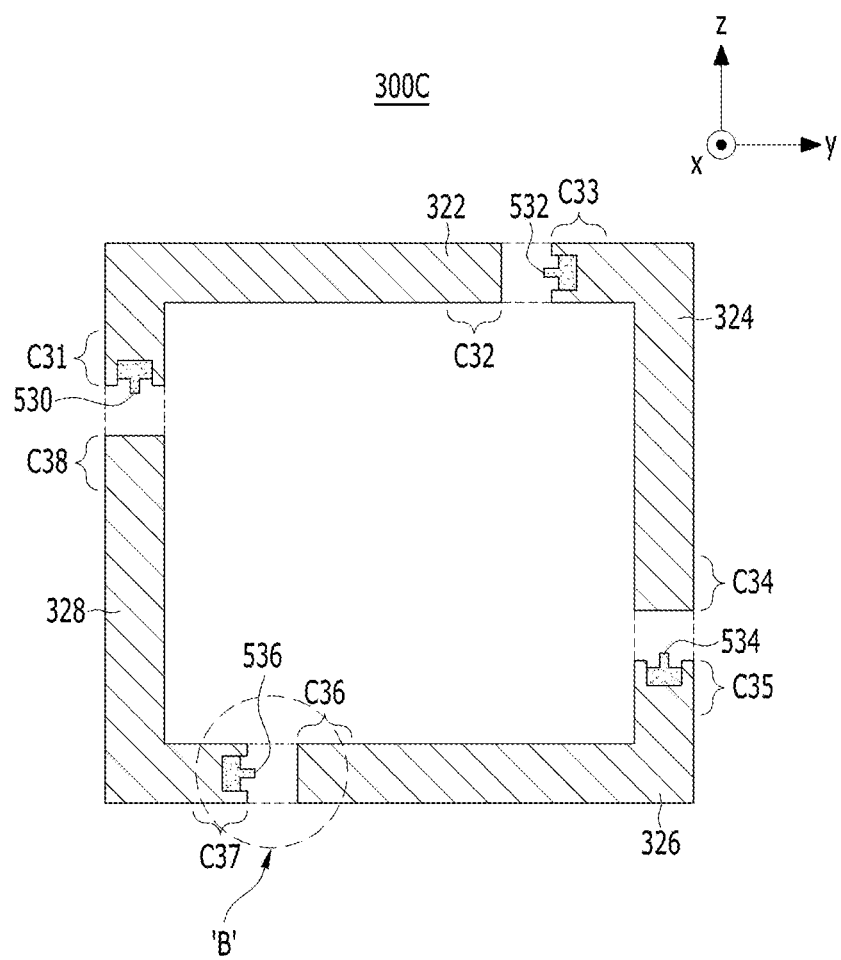
FIG. 7 shows the cross-sectional shape of still another embodiment of an enclosure included in the fuel cell.

FIGS. 5 to 7 show various cross-sectional shapes of enclosures 300A, 300B, and 300C included in the fuel cell 100 according to the embodiment. FIG. 5 shows the cross-sectional shape of the enclosure 300A shown in FIGS. 1, 2, and 3.

The enclosure according to the embodiment may be divided into a plurality of segments.

According to one embodiment, the enclosure may be divided into two segments.

In one example, as shown in FIGS. 1 to 3 and 5, the enclosure 300A may be divided into two segments, namely first and second segments 300U and 300L. The first segment 300U may have a "¬"-shaped external appearance, and the second segment 300L may have an "L"-shaped external appearance. Alternatively, the first segment 300U may have an "L"-shaped external appearance, and the second segment 300L may have a "¬"-shaped external appearance.

In another example, as shown in FIG. 6, the enclosure 300B may be divided into two segments, namely first and second segments 310 and 312. The first segment 310 may have a "["-shaped external appearance, and the second segment 312 may have a "|"-shaped external appearance. Alternatively, although not shown, the first segment 310 may have a "|"-shaped external appearance, and the second segment 312 may have a "["-shaped external appearance. Alternatively, the first segment 310 may have a "-"-shaped (or "U"-shaped) external appearance, and the second segment 312 may have a "U"-shaped (or "-"-shaped) external appearance.

In the case in which the enclosure is a five-surface enclosure that surrounds five surfaces of the cell stack and exposes one surface thereof, only one of the first and second end plates may be coupled to the enclosure.

The embodiment will be described below with reference to the case in which both the first and second end plates are coupled to the enclosure. The following description may also apply to the case in which the enclosure is a five-surface enclosure and only one of the first and second end plates is coupled to the enclosure.

As shown in FIG. 5, in the case in which the enclosure 300A is divided into two segments, the first segment 300U may include first and second coupling portions (or joining portions) C11 and C12, and the second segment 300L, which is coupled (or joined) to the first segment 300U, may include a third coupling portion C13, which faces the first coupling portion C11, and a fourth coupling portion C14, which faces the second coupling portion C12.

As shown in FIG. 6, in the case in which the enclosure 300B is divided into two segments, the first segment 310 may include first and second coupling portions C21 and C22, and the second segment 312, which is coupled to the first segment 310, may include a third coupling portion C23, which faces the first coupling portion C21, and a fourth coupling portion C24, which faces the second coupling portion C22.

In another example, the enclosure may be divided into three or four segments.

For example, as shown in FIG. 7, the enclosure 300C may be divided into four segments, namely first to fourth segments 322, 324, 326, and 328. In the case in which the enclosure 300C is divided into four segments, the first segment 322 may include first and second coupling portions C31 and C32. The second segment 324 may be coupled to the first segment 322, and may include a third coupling portion C33, which faces the second coupling portion C32, and a fourth coupling portion C34, which is formed opposite the third coupling portion C33. The third segment 326 may be coupled to the second segment 324, and may include a fifth coupling portion C35, which faces the fourth coupling portion C34, and a sixth coupling portion C36, which is formed opposite the fifth coupling portion C35. The fourth segment 328 may be coupled to the first and third segments 322 and 326, and may include a seventh coupling portion C37, which faces the sixth coupling portion C36, and an eighth coupling portion C38, which faces the first coupling portion C31.

In still another example, the enclosure may have an external appearance that is divided into two segments such that, among the six surfaces of the enclosure, five surfaces thereof correspond to a first segment and the one remaining surface thereof corresponds to a second segment. However, the embodiments are not limited as to the specific shape of segments or the specific number of segments into which the enclosure is divided.

Further, when the enclosure is divided into a plurality of segments, the segments may be coupled to each other in various ways. For example, the segments may be coupled to each other using a fastener in the form of a bolt or a rivet. However, the embodiments are not limited as to the specific form in which the segments are coupled to each other.

Hereinafter, the fuel cell 100 according to the embodiment will be described as including the enclosure 300A having the shape shown in FIGS. 1 to 3 and 5. However, the following description may also apply to the case in which the fuel cell 100 includes an enclosure having a different shape from the enclosure 300A, e.g. any one of the enclosures 300B and 300C having the shapes shown in FIGS. 6 and 7.

The plate gaskets may be disposed on at least one of the first end plate 112A or the second end plate 112B. For example, as shown in FIGS. 2 to 4, the fuel cell 100 may include first and second plate gaskets 410 and 420, which are respectively disposed on the first and second end plates 112A and 112B.

The first and second plate gaskets 410 and 420 may be respectively embedded in grooves EH1 and EH2 that are respectively formed in the inner surfaces 112AI and 112BI of the first and second end plates 112A and 112B. The following description of the plate gaskets 410 and 420 may also apply to the case in which the fuel cell 100 includes only one of the plate gaskets 410 and 420.

The first plate gasket 410 may be disposed between the inner surface 112AI of the first end plate 112A and the enclosure 300A, and the second plate gasket 420 may be disposed between the inner surface 112BI of the second end plate 112B and the enclosure 300A.

In addition, enclosure gaskets may be disposed between the segments.

According to one embodiment, when the enclosure 300A is divided into two segments 300U and 300L, as shown in FIGS. 1 to 3 and 5, the fuel cell 100 may include first and second enclosure gaskets 510 and 512. The first enclosure gasket may be disposed on the first or third coupling portion C11 or C13. For example, as shown in FIG. 5, the first enclosure gasket 510 may be disposed on the third coupling portion C13. The second enclosure gasket may be disposed on the second or fourth coupling portion C12 or C14. For example, as shown in FIG. 5, the second enclosure gasket 512 may be disposed on the fourth coupling portion C14.

According to another embodiment, when the enclosure 300B is divided into two segments 310 and 312, as shown in FIG. 6, the fuel cell 100 may include first and second enclosure gaskets 520 and 522. The first enclosure gasket may be disposed on the first or third coupling portion C21 or C23. For example, as shown in FIG. 6, the first enclosure gasket 520 may be disposed on the third coupling portion C23. The second enclosure gasket may be disposed on the second or fourth coupling portion C22 or C24. For example, as shown in FIG. 6, the second enclosure gasket 522 may be disposed on the second coupling portion C22.

According to still another embodiment, when the enclosure 300C is divided into four segments 322 to 328, as shown in FIG. 7, the fuel cell 100 may include first to fourth enclosure gaskets 530, 532, 534, and 536. The first enclosure gasket may be disposed on the first or eighth coupling portion C31 or C38. For example, as shown in FIG. 7, the first enclosure gasket 530 may be disposed on the first coupling portion C31. The second enclosure gasket may be disposed on the second or third coupling portion C32 or C33. For example, as shown in FIG. 7, the second enclosure gasket 532 may be disposed on the third coupling portion C33. The third enclosure gasket may be disposed on the fourth or fifth coupling portion C34 or C35. For example, as shown in FIG. 7, the third enclosure gasket 534 may be disposed on the fifth coupling portion C35. The fourth enclosure gasket may be disposed on the sixth or seventh coupling portion C36 or C37. For example, as shown in FIG. 7, the fourth enclosure gasket 536 may be disposed on the seventh coupling portion C37.

As shown in FIGS. 5 to 7, the enclosure gasket provided between neighboring segments is disposed only on either one of two coupling portions facing each other. The reason for this is that, if the enclosure gasket were disposed on both the coupling portions facing each other, the coupling force between neighboring segments would decrease. For example, unlike what is illustrated in FIG. 7, if the enclosure gasket 532 provided between the neighboring first and second segments 322 and 324 were disposed on both the second and third coupling portions C32 and C33, which face each other, the coupling force between the neighboring first and second segments 322 and 324 would decrease.

Figure 8A:
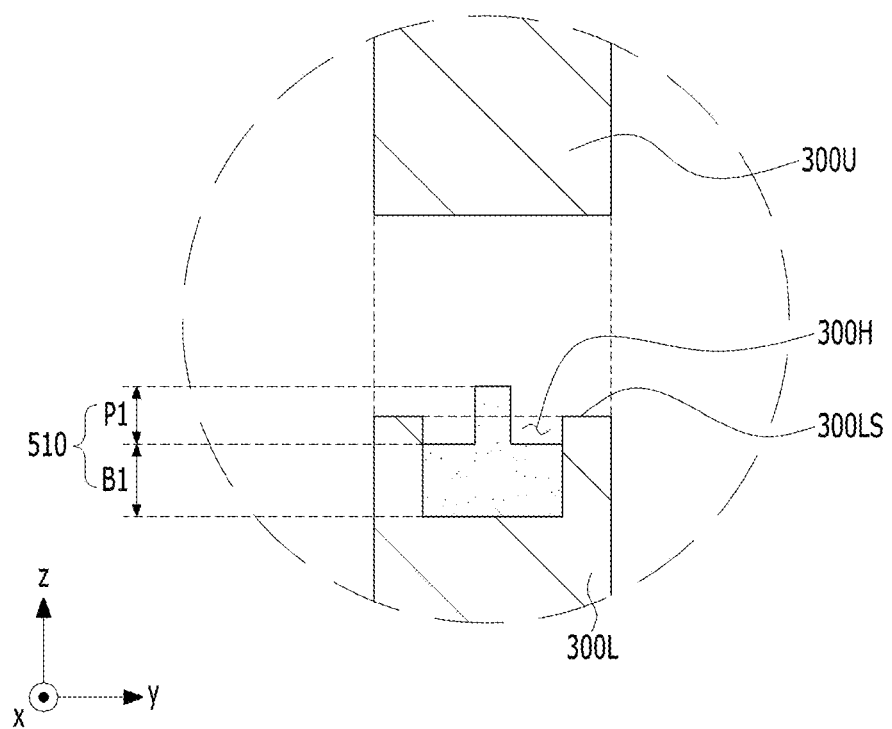
FIG. 8A is an enlarged view of portion 'A' in FIG. 5.
Figure 8B:
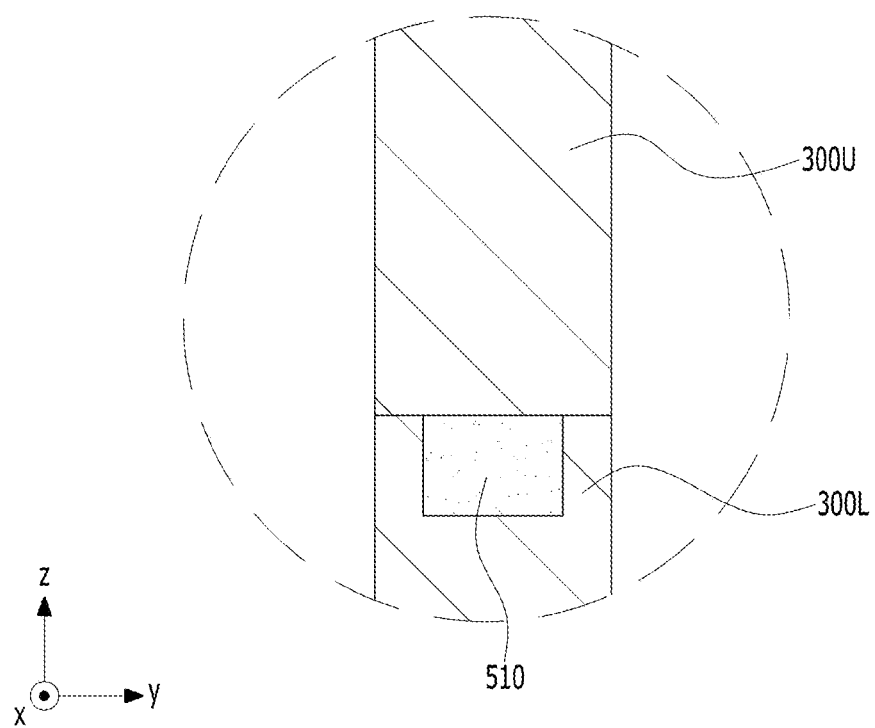
FIG. 8B is a cross-sectional view showing the coupled state of the neighboring segments shown in FIG. 8A.

FIG. 8A is an enlarged and exploded cross-sectional view of portion 'A' in FIG. 5, and FIG. 8B is a cross-sectional view showing the coupled state of the neighboring segments 300U and 300L shown in FIG. 8A.

Figure 9A:
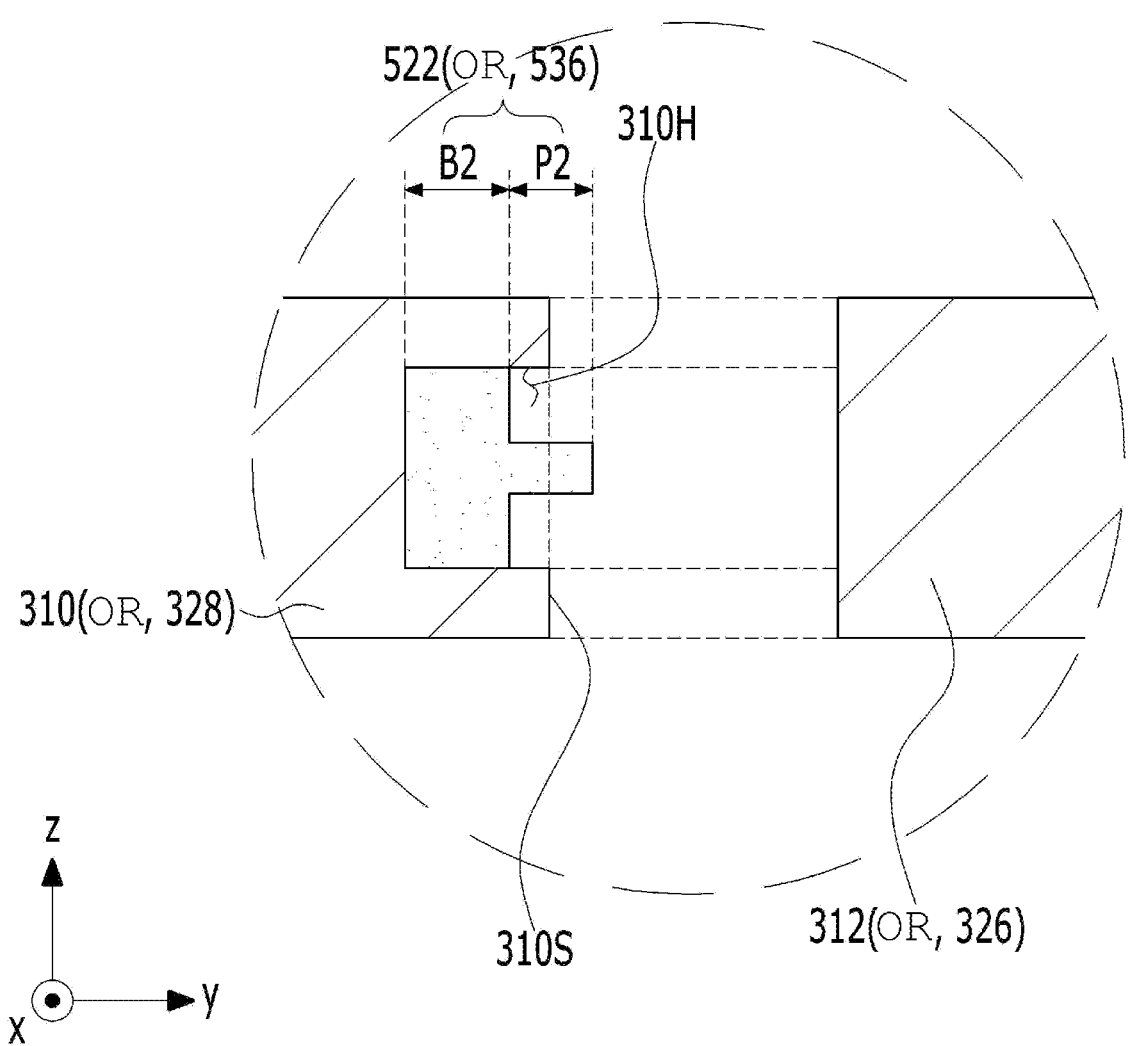
FIG. 9A is an enlarged view of portion 'B' in FIG. 6 or 7.
Figure 9B:
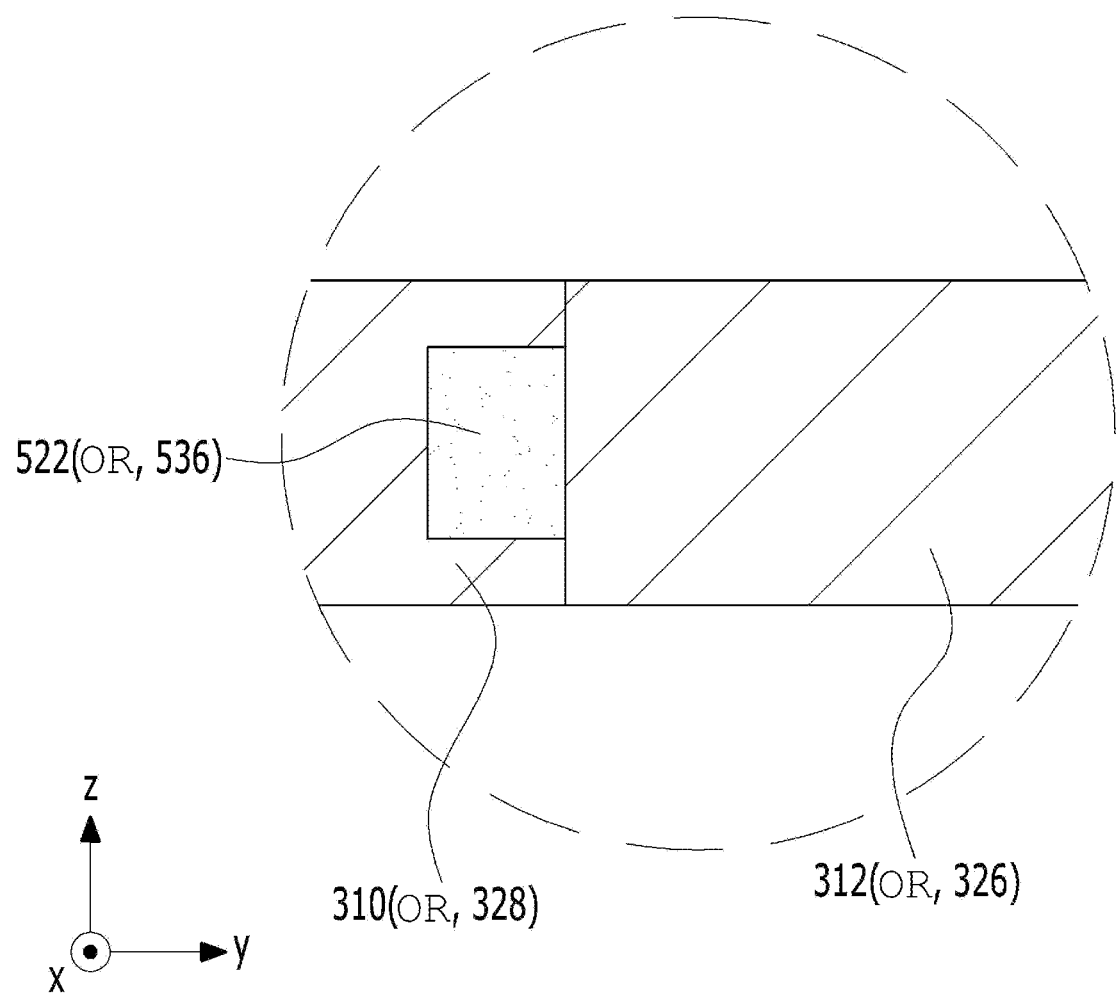
FIG. 9B is a cross-sectional view showing the coupled state of the neighboring segments shown in FIG. 9A.

FIG. 9A is an enlarged and exploded cross-sectional view of portion 'B' in FIG. 6 or 7, and FIG. 9B is a cross-sectional view showing the coupled state of the neighboring segments shown in FIG. 9A.

At least one of the first to fourth enclosure gaskets may include a body, which is embedded in the coupling portion of a corresponding segment, among the first to fourth segments, and a coupling protrusion, which protrudes from the body toward a coupling portion, which the coupling portion of the corresponding segment faces.

For example, referring to FIG. 8A, the first enclosure gasket 510 may include a body B1, which is embedded in the third coupling portion C13 of the second segment 300L, among the first and second segments 300U and 300L, and a coupling protrusion P1, which protrudes from the body B1 toward the first coupling portion C11, which the third coupling portion C13 of the second segment 300L faces. In this case, the coupling protrusion may have a cross-sectional shape that protrudes further than the upper surface of the coupling portion of the corresponding segment toward a coupling portion, which the coupling portion of the corresponding segment faces. For example, referring to FIG. 8A, the coupling protrusion P1 may have a cross-sectional shape that protrudes further than the top surface 300LS of the third coupling portion C13 of the second segment 300L toward the first coupling portion C11, which the third coupling portion C13 of the second segment 300L faces. Due to this structure, when the first and second segments 300U and 300L, which are adjacent to each other, are coupled to each other, as shown in FIG. 8B, the coupling protrusion P1 is pressed by the first coupling portion C11 of the first segment 300U, and thus completely fills a receiving groove 300H in which the body B1 is received, thereby increasing the coupling force between the neighboring first and second segments 300U and 300L.

Also, referring to FIGS. 6 and 9A, the first enclosure gasket 522 may include a body B2, which is embedded in the second coupling portion C22 of the first segment 310, among the first and second segments 310 and 312, and a coupling protrusion P2, which protrudes from the body B2 toward the fourth coupling portion C24, which the second coupling portion C22 of the first segment 310 faces. In this case, the coupling protrusion may have a cross-sectional shape that protrudes further than the top surface of the coupling portion of the corresponding segment toward a coupling portion, which the coupling portion of the corresponding segment faces. For example, referring to FIG. 9A, the coupling protrusion P2 may have a cross-sectional shape that protrudes further than the upper surface 310S of the second coupling portion C22 of the first segment 310 toward the fourth coupling portion C24, which the second coupling portion C22 of the first segment 310 faces. Due to this structure, when the first and second segments 310 and 312, which are adjacent to each other, are coupled to each other, as shown in FIG. 9B, the coupling protrusion P2 is pressed by the fourth coupling portion C24 of the second segment 312, and thus completely fills a receiving groove 310H in which the body B2 is received, thereby increasing the coupling force between the neighboring first and second segments 310 and 312.

Also, referring to FIGS. 7 and 9A, the fourth enclosure gasket 536 may include a body B2, which is embedded in the seventh coupling portion C37 of the fourth segment 328, among the first to fourth segments 322, 324, 326, and 328, and a coupling protrusion P2, which protrudes from the body B2 toward the sixth coupling portion C36, which the seventh coupling portion C37 of the fourth segment 328 faces. In this case, the coupling protrusion may have a cross-sectional shape that protrudes further than the top surface of the coupling portion of the corresponding segment toward a coupling portion, which the coupling portion of the corresponding segment faces. For example, referring to FIG. 9A, the coupling protrusion P2 may have a cross-sectional shape that protrudes further than the top surface 310S of the seventh coupling portion C37 of the fourth segment 328 toward the sixth coupling portion C36, which the seventh coupling portion C37 of the fourth segment 328 faces. Due to this structure, when the third and fourth segments 326 and 328, which are adjacent to each other, are coupled to each other, as shown in FIG. 9B, the coupling protrusion P2 is pressed by the sixth coupling portion C36 of the third segment 326, and thus completely fills a receiving groove 310H in which the body B2 is received, thereby increasing the coupling force between the neighboring third and fourth segments 326 and 328.

Also, referring to FIG. 3, the enclosure gasket (e.g. 510) has a length X2 extending in the first direction, and the enclosure 300A has a length X1 extending in the first direction. In this case, X2 may be longer than X1. The reason why the length X2 of the enclosure gasket (e.g. 510) is longer than the length X1 of the enclosure 300A is to couple (or join) the enclosure gasket (e.g. 510) to the plate gaskets 410 and 420, which will be described later.

One of the plate gasket and the enclosure gasket may include a protruding portion that protrudes in the first direction, and the other one thereof may include a depressed portion that is depressed in the first direction to receive the protruding portion fitted thereinto. In this way, the plate gasket and the enclosure gasket may be coupled to each other by coupling (or female-male engagement) between the protruding portion and the depressed portion.

Hereinafter, various embodiments in which the protruding portion and the depressed portion are coupled to each other will be described with reference to FIGS. 10 and 11.

Figure 10A:
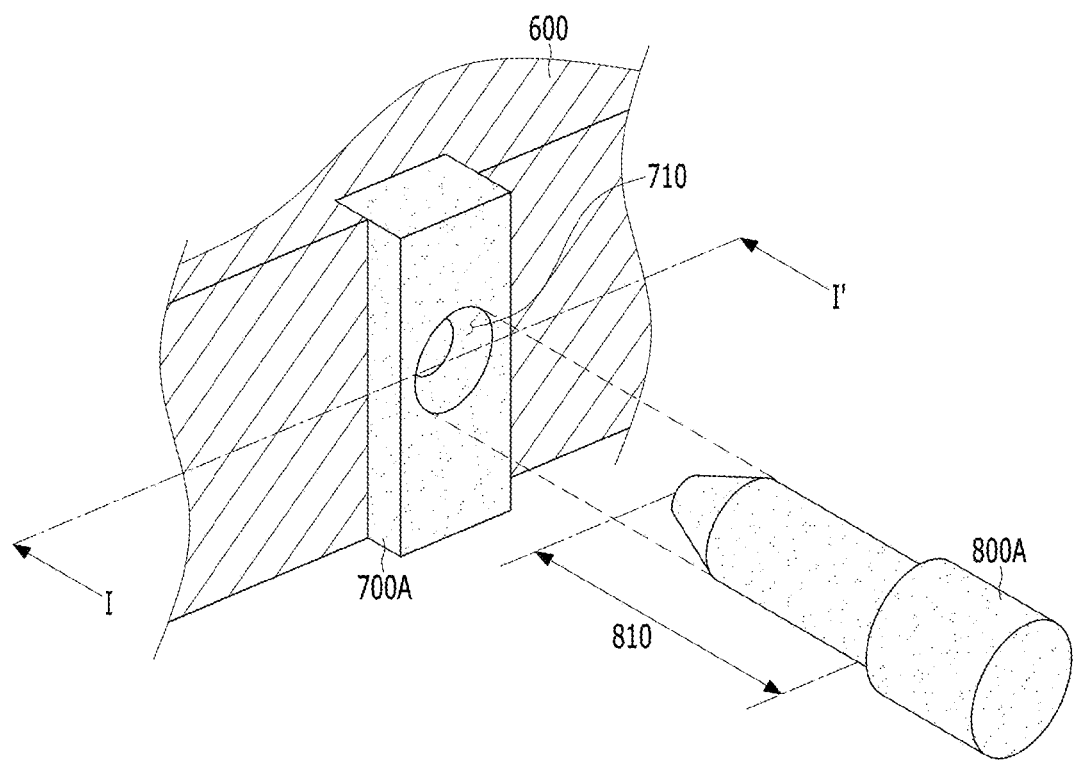
FIG. 10A is an exploded perspective view of a portion of a fuel cell according to an embodiment.
Figure 10B:
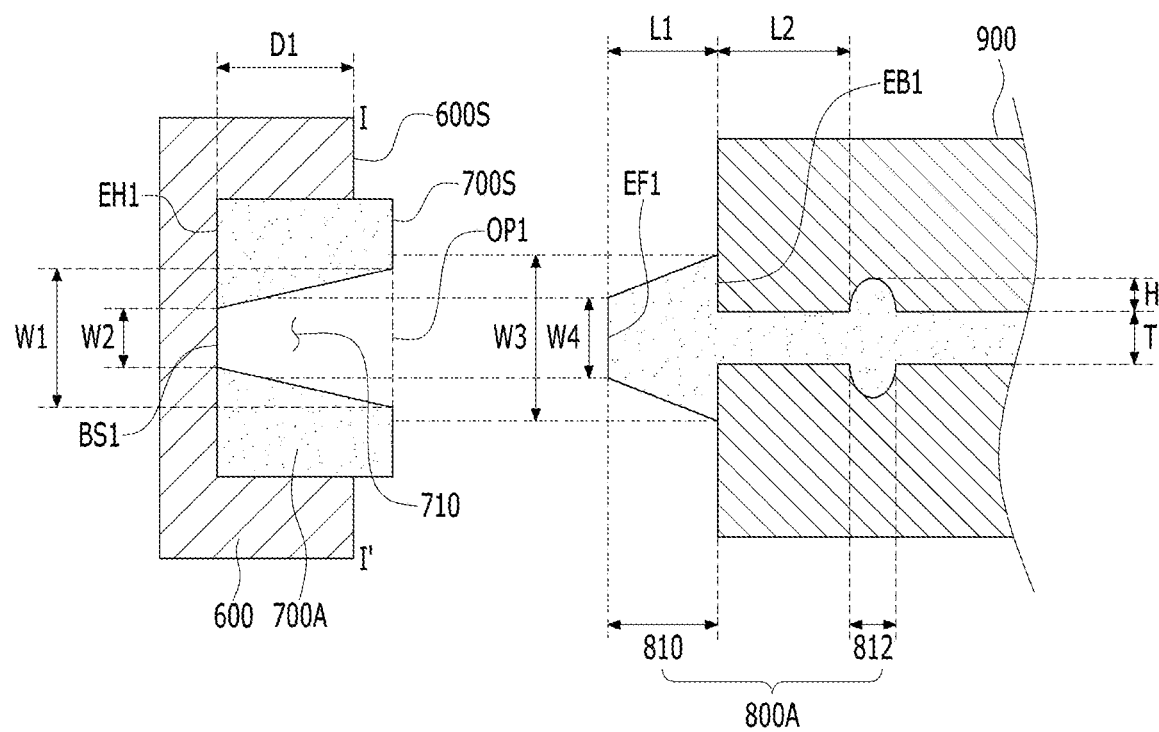
FIGS. 10B and 10C are, respectively, an exploded cross-sectional view and a coupled cross-sectional view of the fuel cell shown in FIG. 10A, taken along line I-I'.
Figure 10C:
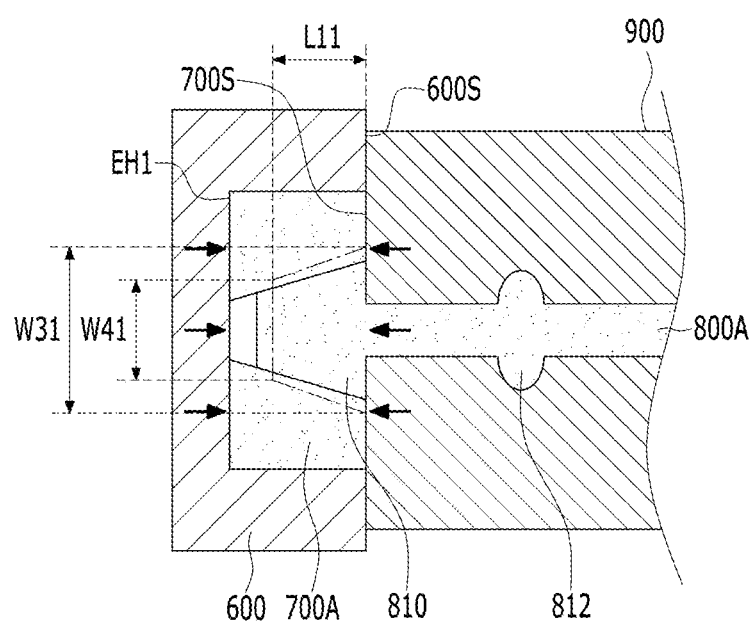

FIG. 10A is an exploded perspective view of a portion of a fuel cell according to an embodiment, and FIGS. 10B and 10C are, respectively, an exploded cross-sectional view and a coupled cross-sectional view of the fuel cell shown in FIG. 10A, taken along line I-I'.

According to an embodiment, the fuel cell shown in FIGS. 10A to 10C may include an end plate 600, a plate gasket 700A, an enclosure gasket 800A, and an enclosure 900. Here, the end plate 600, the plate gasket 700A, the enclosure gasket 800A, and the enclosure 900 may respectively correspond to the first end plates 112A and 112B, the plate gaskets 410 and 420, the enclosure gaskets 510, 512, 520, 522, 530, 532, 534, and 536, and the enclosures 300A, 300B, and 300C described above.

The plate gasket 700A is embedded in a groove portion EH1 in the end plate 600, and protrudes a predetermined thickness above the inner surface 600S of the end plate 600 toward the enclosure 900 before the enclosure 900 and the end plate 600 are coupled to each other, as shown in FIG. 10B. Thereafter, when the enclosure 900 and the end plate 600 are coupled to each other, the portion of the plate gasket 700A that protrudes above the inner surface 600S is tightly fitted into the groove portion EH1, as shown in FIG. 10C, and accordingly, the upper surface 700S of the plate gasket 700A becomes coplanar with the inner surface 600S.

According to an embodiment, the enclosure gasket 800A may include a protruding portion 810, which protrudes in the first direction, and the plate gasket 700A may include a depressed portion 710, which is depressed in the first direction to receive the protruding portion 810 fitted thereinto. In this way, the plate gasket 700A and the enclosure gasket 800A may be coupled to each other by female-male engagement between the protruding portion 810 and the depressed portion 710.

In the case shown in FIG. 10B, the depth of the depressed portion 710 is greater than D1. However, as shown in FIG. 10C, when the plate gasket 700A is completely fitted into the groove portion EH1, the depth D1 corresponds to the actual length of the depressed portion 710.

If the length L1 that the protruding portion 810 protrudes in the first direction is not less than the depth D1 to which the depressed portion 710 is depressed in the first direction, when the enclosure 900 and the end plate 600 are coupled to each other, the protruding portion 810 is not capable of being completely inserted into the depressed portion 710, thus leading to erroneous assembly, or the protruding portion 8w may become separated from the depressed portion 710, thus leading to unreliable female-male engagement. In order to prevent this, according to the embodiment, the length L1 of the protruding portion 810 may be less than the depth D1 of the depressed portion 710.

The width W4 of the front end EF1 of the protruding portion 810 in the second direction may be smaller than the width W3 of the rear end EB1 of the protruding portion 810 in the second direction, and the width W1 of the opening OP1 of the depressed portion 710 may be larger than the width W2 of the bottom BS1 of the depressed portion 710.

Also, the width W4 of the front end EF1 of the protruding portion 810 in the second direction may be smaller than the width W1 of the opening OP1 of the depressed portion 710 in the second direction.

In this case, each of the protruding portion 810 and the depressed portion 710 may have an inclined cross-sectional shape. Accordingly, the protruding portion 810 may be easily inserted into the depressed portion 710.

Referring to FIG. 10C, when the protruding portion 810 is inserted into the depressed portion 710, the protruding portion 810 and the depressed portion 710 may be elastically coupled to each other such that the protruding portion 810 expands in the second direction and contracts in the first direction and such that the depressed portion 710 expands in the second direction to the same extent as the protruding portion 810. That is, the width of the rear end EB1 of the protruding portion 810 may increase in the second direction from W3 to W31, the length that the protruding portion 810 protrudes may decrease from L1 to L11, and the width of the opening OP1 of the depressed portion 710 may increase in the second direction from W1 by the width by which the protruding portion 810 expands.

In order to allow the depressed portion 710 to expand to the same extent as the protruding portion 810, the plate gasket 700A and the enclosure gasket 800A may have the same elasticity. If the plate gasket 700A and the enclosure gasket 800A do not have the same elasticity, the expansion rates thereof differ from each other, and accordingly, the depressed portion 710 is not capable of expanding to the same extent as the protruding portion 810.

In addition, the enclosure gasket 800A may include a fixing protrusion 812, which protrudes in the second direction, which intersects the first direction.

The distance L2 that the fixing protrusion 812 is spaced apart from the rear end EB1 of the protruding portion 810 in the first direction may be zero (0) or more. If the distance L2 is zero, burrs may be generated during the manufacturing process. Therefore, when the distance L2 is greater than zero, the process of manufacturing the enclosure gasket 800A may be more reliably performed than when the distance L2 is zero. Also, if the portion indicated by "L2" is inserted into the depressed portion 710 together with the protruding portion 810, watertightness may be degraded. Therefore, the enclosure gasket 800A may be formed such that only the protruding portion 810 is inserted into the depressed portion 710.

The height H that the fixing protrusion 812 protrudes in the second direction may be proportional to the thickness T of the enclosure gasket 800A in the second direction.

Figure 11A:
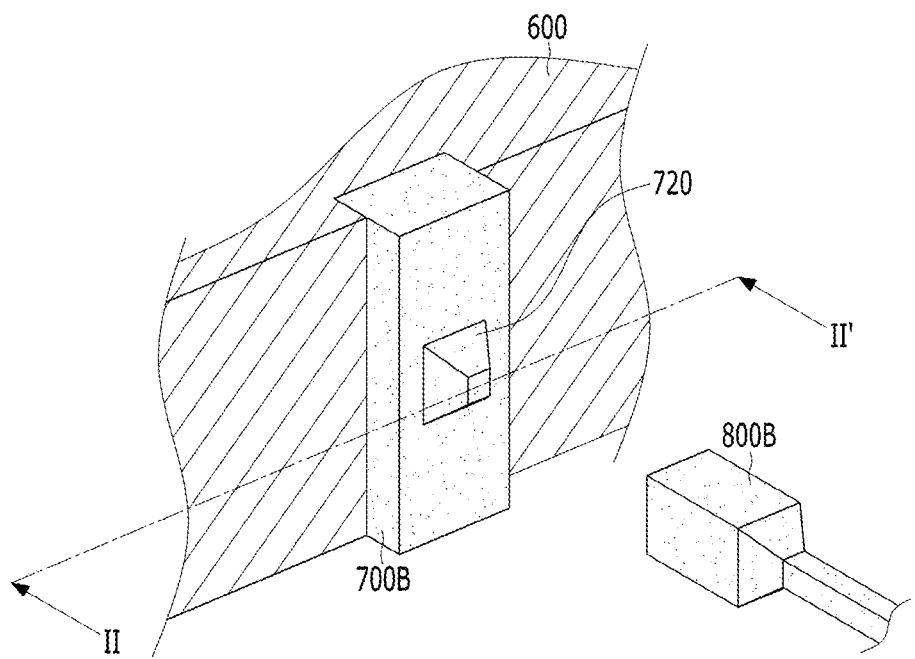
FIG. 11A is an exploded perspective view of a portion of a fuel cell according to another embodiment.
Figure 11B:
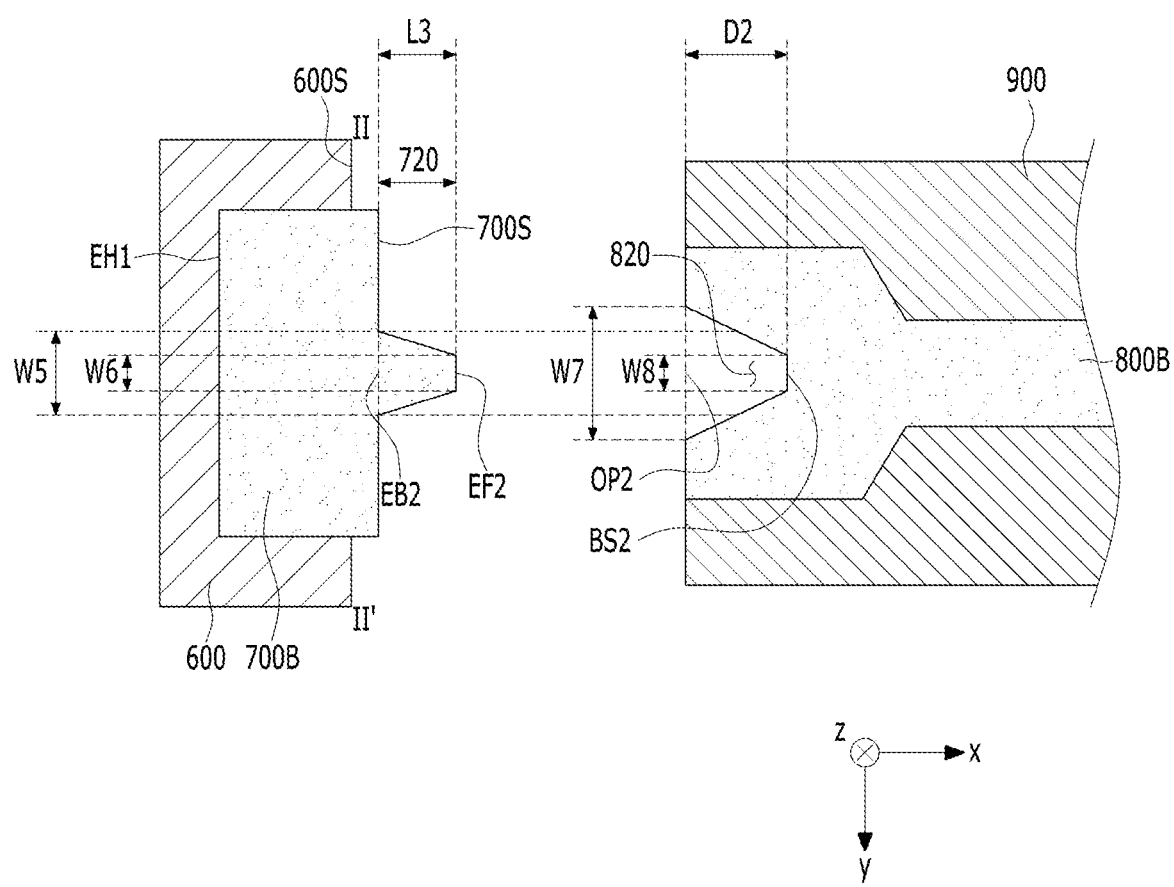
FIGS. 11B and 11C are, respectively, an exploded cross-sectional view and a coupled cross-sectional view of the fuel cell shown in FIG. 11A, taken along line II-II'.
Figure 11C:
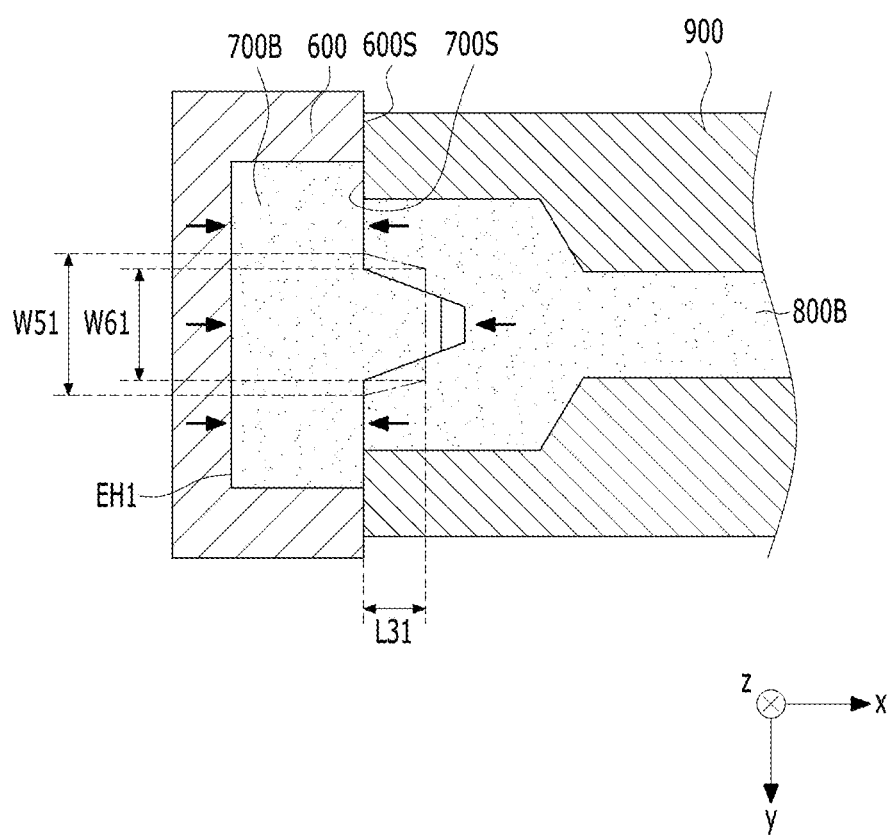

FIG. 11A is an exploded perspective view of a portion of a fuel cell according to another embodiment, and FIGS. 11B and 11C are, respectively, an exploded cross-sectional view and a coupled cross-sectional view of the fuel cell shown in FIG. 11A, taken along line II-II'.

According to another embodiment, the fuel cell shown in FIGS. 11A to 11C may include an end plate 600, a plate gasket 700B, an enclosure gasket 800B, and an enclosure 900. Here, the end plate 600, the plate gasket 700B, the enclosure gasket 800B, and the enclosure 900 may respectively correspond to the first end plates 112A and 112B, the plate gaskets 410 and 420, the enclosure gaskets 510, 512, 520, 522, 530, 532, 534, and 536, and the enclosures 300A, 300B, and 300C described above.

The plate gasket 700B is embedded in a groove portion EH1 in the end plate 600, and protrudes a predetermined thickness above the inner surface 600S of the end plate 600 toward the enclosure 900 before the enclosure 900 and the end plate 600 are coupled to each other, as shown in FIG. 11B. Thereafter, when the enclosure 900 and the end plate 600 are coupled to each other, the portion of the plate gasket 700B that protrudes above the inner surface 600S is tightly fitted into the groove portion EH1, as shown in FIG. 11C, and accordingly, the upper surface 700S of the plate gasket 700B becomes coplanar with the inner surface 600S.

According to this embodiment, the plate gasket 700B may include a protruding portion 720, which protrudes in the first direction, and the enclosure gasket 800B may include a depressed portion 820, which is depressed in the first direction to receive the protruding portion 720 fitted thereinto. In this way, the plate gasket 700B and the enclosure gasket 800B may be coupled to each other by female-male engagement between the protruding portion 720 and the depressed portion 820.

In the case shown in FIG. 11B, the length that the protruding portion 720 protrudes is greater than L3. However, as shown in FIG. 11C, when the plate gasket 700B is completely fitted into the groove portion EH1, the protruding length L3 corresponds to the actual length of the protruding portion 720.

If the length L3 that the protruding portion 720 protrudes in the first direction is not less than the depth D2 to which the depressed portion 820 is depressed in the first direction, when the enclosure 900 and the end plate 600 are coupled to each other, the protruding portion 720 is not capable of being completely inserted into the depressed portion 820, thus leading to erroneous assembly, or the protruding portion 720 may become separated from the depressed portion 820, thus leading to unreliable female-male engagement. In order to prevent this, according to the embodiment, the length L3 of the protruding portion 720 may be less than the depth D2 of the depressed portion 820.

The width W6 of the front end EF2 of the protruding portion 720 in the second direction may be smaller than the width W5 of the rear end EB2 of the protruding portion 720 in the second direction, and the width W7 of the opening OP2 of the depressed portion 820 may be larger than the width W8 of the bottom BS2 of the depressed portion 820.

Also, the width W6 of the front end EF2 of the protruding portion 720 in the second direction may be smaller than the width W7 of the opening OP2 of the depressed portion 820 in the second direction.

In this case, each of the protruding portion 720 and the depressed portion 820 may have an inclined cross-sectional shape. Accordingly, the protruding portion 720 may be easily inserted into the depressed portion 820.

Referring to FIG. 11C, when the protruding portion 720 is inserted into the depressed portion 820, the protruding portion 720 and the depressed portion 820 may be elastically coupled to each other such that the protruding portion 720 expands in the second direction and contracts in the first direction and such that the depressed portion 820 expands in the second direction to the same extent as the protruding portion 720. That is, the width of the rear end EB2 of the protruding portion 720 may increase in the second direction from W5 to W51, the length that the protruding portion 720 protrudes may decrease from L3 to L31, and the width of the opening OP2 of the depressed portion 820 may increase in the second direction from W7 by the width by which the protruding portion 720 expands.

In order to allow the depressed portion 820 to expand to the same extent as the protruding portion 720, the plate gasket 700B and the enclosure gasket 800B may have the same elasticity.

If the plate gasket 700B and the enclosure gasket 800B do not have the same elasticity, the expansion rates thereof differ from each other, and accordingly, the depressed portion 820 is not capable of expanding to the same extent as the protruding portion 720.

The plate gaskets 700A and 700B and the enclosure gaskets 800A and 800B described above may be made of the same material, for example, rubber or plastic. However, the embodiments are not limited to any specific material of the plate gaskets 700A and 700B or the enclosure gaskets 800A and 800B.

Hereinafter, a fuel cell according to a comparative example and the fuel cell according to the embodiment will be described.

In the case of a fuel cell according to the comparative example, a plate gasket and an enclosure gasket are in surface contact with each other, rather than being coupled to each other in a female-male engagement manner. In this case, a path through which moisture or air can permeate may be formed at a triple point at which an enclosure, the enclosure gasket, which is disposed between divided segments of the enclosure, and the plate gasket meet, thus leading to degradation of watertightness and airtightness. Although the gasket of the end plate and the gasket of the enclosure are provided, a sufficient amount of surface pressure is not formed at the triple point at which the aforementioned three components meet due to the engagement structure thereof, thus failing to prevent permeation of moisture.

In contrast, in the case of the embodiment, the enclosure gasket 510, 512, 520, 522, 530, 532, 534, 536, 800A, or 800B and the plate gasket 410, 420, 700A, or 700B are coupled to each other in a female-male engagement manner, rather than being in surface contact with each other. Accordingly, a triple point at which the enclosure 300A, 300B, 300C, or 900, the enclosure gasket 510, 512, 520, 522, 530, 532, 534, 536, 800A, or 800B, which is disposed between the divided segments of the enclosure 300A, 300B, 300C, or 900, and the plate gasket 410, 420, 700A, or 700B meet is more reliably sealed, thereby blocking a path through which moisture or air can permeate, thus improving performance with regard to watertightness and airtightness. As a result, it is possible to meet a waterproof criterion for a vehicle that uses a fuel cell.

In addition, in the fuel cell according to the embodiment, when the end plate 112A, 112B, or 600 and the enclosure 300A, 300B, 300C, or 900 are coupled to each other, a sufficient amount of surface pressure may be formed at a point at which the plate gasket 410, 420, 700A, or 700B and the enclosure gasket 510, 512, 520, 522, 530, 532, 534, 536, 800A, or 800B meet. The reason for this is that the force by which the segment adjacent thereto presses the plate gasket, the force by which the plate adjacent thereto presses the enclosure gasket, and the force by which the protruding portion 810 (or 720) presses the depressed portion 710 (or 820) increase. To this end, as shown in FIGS. 10B and 11B, the plate gasket 700A or 700B may protrude a predetermined thickness above the inner surface 600S of the end plate 600 toward the enclosure 900 before the enclosure 900 and the end plate 600 are coupled to each other.

Further, as shown in FIG. 10C, the width of the protruding portion 810 in the second direction increases from W3 to W31, and as shown in FIG. 11C, the width of the protruding portion 720 in the second direction increases from W5 to W51. Accordingly, the clamping pressure may increase as indicated by the arrows.

The position of the enclosure gasket may not be fixed, but may be misaligned for various reasons. For example, the position of the enclosure gasket may be misaligned by the pressure generated when the segments are coupled to each other or when the enclosure gasket is coupled to the plate gasket. In order to prevent this, the enclosure gasket 800A includes the fixing protrusion 812. For example, if the height H of the fixing protrusion 812 satisfies Equation 1 below, the fixing protrusion 812 may perform the function thereof more reliably. However, the embodiments are not limited to any specific value of height H.

$$H > T/2 \quad \text{[Equation 1]}$$

Therefore, according to the embodiment, due to the presence of the fixing protrusion 812, the position of the enclosure gasket 510, 512, 520, 522, 530, 532, 534, 536, or 800A is fixed without being misaligned even under various situations. Accordingly, when the plate gasket 410, 420, or 700A and the enclosure gasket 510, 512, 520, 522, 530, 532, 534, 536, or 800A are coupled to each other, the position of the protruding portion 810 that is inserted into the depressed portion 710 is fixed without being misaligned. Accordingly, the plate gasket 410, 420, or 700A and the enclosure gasket 510, 512, 520, 522, 530, 532, 534, 536, or 800A are stably coupled to each other at the triple point, and thus the coupling force therebetween increases. As a result, the fuel cell according to the embodiment has improved performance with regard to watertightness and airtightness.

In the process of manufacturing the fuel cell, the first end plate 112A (or the second end plate 112B) is placed below stacking equipment. Thereafter, the unit cells are sequentially stacked on the first end plate 112A (or the second end plate 112B) in order from the first unit cell 122-1 to the last unit cell 122-N, and then the second end plate 112B (or the first end plate 112A) is stacked on the last unit cell 122-N. Thereafter, the segments and the end plates 112A and 112B are coupled to each other by pressing the same using a press. In the case in which the protruding portion 810 and the depressed portion 710 are formed as shown in FIGS. 10A to 10C, it is possible to insert the protruding portion 810 into the depressed portion 710 while visually checking the same during the above process. Accordingly, workability is improved.

As is apparent from the above description, according to a fuel cell according to the embodiment, coupling pressure between gaskets increases, thereby improving performance with regard to watertightness and airtightness, thus meeting a waterproof criterion for a vehicle that uses a fuel cell. In addition, workability is improved.

However, the effects achievable through the embodiments are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell comprising:
a cell stack comprising a plurality of unit cells stacked in a first direction;
an end plate disposed on at least one of both side ends of the cell stack;
an enclosure coupled to the end plate to surround a side portion of the cell stack, the enclosure being divided into a plurality of segments;
a plate gasket disposed on the end plate; and
an enclosure gasket disposed between the plurality of segments,
wherein one of the plate gasket and the enclosure gasket comprises a protruding portion protruding in the first direction, and a remaining one of the plate gasket and the enclosure gasket comprises a depressed portion depressed in the first direction to receive the protruding portion fitted thereinto.

2. The fuel cell according to claim 1, wherein the plurality of segments comprises:
a first segment comprising a first coupling portion and a second coupling portion; and
a second segment coupled to the first segment, the second segment comprising a third coupling portion and a fourth coupling portion, the third coupling portion and the fourth coupling portion respectively facing the first coupling portion and the second coupling portion.

3. The fuel cell according to claim 2, wherein the enclosure gasket comprises:
a first enclosure gasket disposed on the first coupling portion or the third coupling portion; and
a second enclosure gasket disposed on the second coupling portion or the fourth coupling portion.

4. The fuel cell according to claim 2,
wherein the first segment has an "L"-shaped external appearance, and
wherein the second segment has a "¬"-shaped external appearance.

5. The fuel cell according to claim 1, wherein the plurality of segments comprises:
a first segment comprising a first coupling portion and a second coupling portion;
a second segment coupled to the first segment, the second segment comprising a third coupling portion facing the second coupling portion and a fourth coupling portion formed opposite the third coupling portion;
a third segment coupled to the second segment, the third segment comprising a fifth coupling portion facing the fourth coupling portion and a sixth coupling portion formed opposite the fifth coupling portion; and
a fourth segment coupled to the first segment and the third segment, the fourth segment comprising a seventh coupling portion facing the sixth coupling portion and an eighth coupling portion facing the first coupling portion.

6. The fuel cell according to claim 5, wherein the enclosure gasket comprises:

a first enclosure gasket disposed on the first coupling portion or the eighth coupling portion;

a second enclosure gasket disposed on the second coupling portion or the third coupling portion;

a third enclosure gasket disposed on the fourth coupling portion or the fifth coupling portion; and a fourth enclosure gasket disposed on the sixth coupling portion or the seventh coupling portion.

7. The fuel cell according to claim 6, wherein at least one of the first to fourth enclosure gaskets comprises:

a body embodied in a coupling portion of a corresponding segment, among the first to fourth segments; and a coupling protrusion protruding from the body toward a coupling portion facing the coupling portion of the corresponding segment.

8. The fuel cell according to claim 1, wherein the enclosure gasket is disposed so as to extend in the first direction, and has a length longer than a length of the enclosure in the first direction.

9. The fuel cell according to claim 1, wherein the protruding portion is disposed on the enclosure gasket, and wherein the depressed portion is disposed in the plate gasket.

10. The fuel cell according to claim 1, wherein the protruding portion is disposed on the plate gasket, and wherein the depressed portion is disposed in the enclosure gasket.

11. The fuel cell according to claim 1, wherein a length in which the protruding portion protrudes in the first direction is less than a depth in which the depressed portion is depressed in the first direction.

12. The fuel cell according to claim 1, wherein, when the protruding portion is inserted into the depressed portion, the protruding portion and the depressed portion are elastically coupled to each other such that the protruding portion expands in a second direction, the second direction intersecting the first direction, and contracts in the first direction and such that the depressed portion expands in the second direction to the same extent as the protruding portion.

13. The fuel cell according to claim 1, wherein the enclosure gasket comprises a fixing protrusion protruding in a second direction, the second direction intersecting the first direction.

14. The fuel cell according to claim 13, wherein a distance that the fixing protrusion is spaced apart from a rear end of the protruding portion in the first direction is 0 or more.

15. The fuel cell according to claim 13, wherein a height that the fixing protrusion protrudes in the second direction is proportional to a thickness of the enclosure gasket in the second direction.

16. The fuel cell according to claim 1, wherein each of the protruding portion and the depressed portion has an inclined cross-sectional shape.

17. The fuel cell according to claim 16, wherein a width of a front end of the protruding portion in a second direction, the second direction intersecting the first direction, is smaller than a width of an opening of the depressed portion in the second direction.

18. The fuel cell according to claim 1, wherein the plate gasket and the enclosure gasket have the same elasticity.

19. The fuel cell according to claim 1, wherein each unit cell includes a membrane electrode assembly, gas diffusion layers (GDLs), several inner gaskets, and first and second separators.

* * * * *